United States Patent [19]

Shibata

[11] Patent Number: 4,656,542
[45] Date of Patent: Apr. 7, 1987

[54] DEVICE FOR LOADING AND EJECTING A FLOPPY DISK INTO AND FROM A MAGNETIC DISK DRIVE

[75] Inventor: Haruo Shibata, Tokyo, Japan

[73] Assignee: Kabushiki Kaisha Toshiba, Kawasaki, Japan

[21] Appl. No.: 613,323

[22] Filed: May 23, 1984

[30] Foreign Application Priority Data

May 31, 1983 [JP] Japan ................... 58-96171

[51] Int. Cl.$^4$ ............................................. G11B 17/02
[52] U.S. Cl. ........................................ 360/97; 360/99
[58] Field of Search ................................ 360/97–99

[56] References Cited

U.S. PATENT DOCUMENTS

| | | | |
|---|---|---|---|
| 3,770,908 | 11/1973 | Craggs | 360/97 |
| 3,845,502 | 10/1974 | Paus | 360/97 |
| 3,899,794 | 8/1975 | Brown, Jr. | 360/133 |
| 3,972,072 | 7/1976 | Richt | 360/93 |
| 4,024,581 | 5/1977 | Lesca et al. | 360/99 |
| 4,065,800 | 12/1977 | Wilson et al. | 360/137 |
| 4,208,681 | 6/1980 | Hatchett | 360/97 |
| 4,227,224 | 10/1980 | Umezawa et al. | 360/96.5 |
| 4,272,794 | 6/1981 | Sharky | 360/97 |
| 4,310,864 | 1/1982 | Patel et al. | 360/97 |
| 4,368,495 | 1/1983 | Hamanaka et al. | 360/97 |
| 4,447,838 | 5/1984 | Kato | 360/96.5 |
| 4,479,210 | 1/1984 | Nakayama | 369/194 |
| 4,539,613 | 9/1985 | Suyama et al. | 360/97 |
| 4,562,498 | 12/1985 | Shibata | 360/97 |

FOREIGN PATENT DOCUMENTS

| | | |
|---|---|---|
| 891045 | 1/1982 | Belgium . |
| 892951 | 8/1982 | Belgium . |
| 0082505 | 6/1983 | European Pat. Off. . |
| 57-6462 | 1/1982 | Japan . |

OTHER PUBLICATIONS

Tandon Corporation, "TM 35-2/TM 35-4 Specifications", 1982.

*Primary Examiner*—Robert S. Tupper
*Attorney, Agent, or Firm*—Cushman, Darby & Cushman

[57] ABSTRACT

A loading/ejecting device for loading and ejecting a floppy disk into and from a magnetic disk drive apparatus has a holder for containing the disk therein. The holder is supported by a pair of guide plates to be movable directly between a first position where the disk can be inserted into or ejected from the holder and a second position where the disk can be reproduced or recorded. A loading/ejecting member is supported by the guide plates to be movable between an initial position and a forward position. The member is urged by tension springs toward the forward position and is latch by a latching member in the initial position. When the disk is inserted into the holder, a urging member supported on the holder is moved by the disk to push the latching member, thereby disengaging the latching member from the loading/ejecting member. As a result, the loading/ejecting member is moved from the initial position to the forward position, thereby moving the holder from the first position to the second position. A hold plate is mounted on the holder and locks the disk in a predetermined position in the holder when the disk is inserted into the holder. The loading/ejecting member has an urging arm. When the loading/ejecting member is moved from the forward position to the initial position, the holder is moved from the second position to the first position by the member and the hold plate is urged by the urging arm to release the locked state of the disk.

15 Claims, 15 Drawing Figures

DEVICE FOR LOADING AND EJECTING A FLOPPY DISK INTO AND FROM A MAGNETIC DISK DRIVE

BACKGROUND OF THE INVENTION

1. Field of the Invention

The present invention relates to a magnetic disk loading/ejecting device used in a magnetic disk drive apparatus.

2. Description of the Prior Art

Conventionally, a magnetic disk drive apparatus such as a floppy disk drive apparatus as an external memory of a computer has a loading/ejecting device for loading/ejecting a disk. The loading/ejecting device has a holder for positioning a floppy disk to a drive position. This holder is pivotally mounted on a base of a floppy disk drive device and can be interlocked with a door disposed to freely close/open a floppy disk insertion port of the drive device. The holder has a clamper. While the door is closed, the holder is held at the first position. In this position, the clamper of the holder cooperates with a spindle mounted on the base to clamp the floppy disk. When the door is opened, the holder is pivoted to the second position to separate the clamper from the spindle. When the floppy disk is inserted through the insertion hole and is placed on the spindle, and the door is closed, the holder is pivoted to the first position, so that the floppy disk is clamped between the spindle and the clamper and is placed in the driven position.

In this manner, the conventional holder can be pivoted between the first and second positions. For this reason, a relatively large space is required for the pivotal movement of the holder. The magnetic disk drive apparatus becomes large in size, and the positioning precision of the floppy disk is degraded, resulting in inconvenience.

The same applicant proposed a loading/ejecting device which overcome the above-mentioned drawbacks and which was described in U.S. Pat. No. 4,562,498 issued on Dec. 31, 1985. According to this device, when the floppy disk is inserted in the holder, the holder is vertically moved together with the floppy disk to the driven position. The floppy disk is ejected by pressing a loading/ejecting plate from the initial position to the forward position, and the holder is vertically moved upward together with the floppy disk. In this manner, according to this device, since the holder can be linearly moved along the vertical direction, the drawbacks described above can be solved. The loading/ejecting plate is normally biased by a biasing member toward the initial position. When the loading/ejecting plate is pressed to the forward position against the biasing force of the biasing member, the plate is locked in the forward position. However, in this device, when the pressing operation of the plate is stopped before the plate is locked in the forward position (i.e., before the holder is completely lifted), the plate is biased by the biasing member and is returned to the initial position. For this reason, the holder is moved downward with the loading/ejecting plate although the floppy disk is being ejected. Therefore, the floppy disk is moved downward together with the holder while the disk is partially ejected. The floppy disk is then clamped by the holder. If this happens, the floppy disk or the drive apparatus will be damaged.

SUMMARY OF THE INVENTION

The present invention has been made in consideration of the above situation, and has as its object to provide a magnetic disk loading/ejecting device capable of constituting a compact magnetic disk drive apparatus, positioning a magnetic disk with high precision, and properly ejecting the magnetic disk.

According to an aspect of the invention, a loading/ejecting device comprises: guiding means mounted on a base of a magnetic disk drive device; a holder, located on driving means of the magnetic disk drive device, for holding a magnetic disk, the holder being supported by the guiding means to be linearly movable between a first position where the magnetic disk can be inserted or ejected and a second position where the magnetic disk can be driven; a loading/ejecting member, supported by the guiding means to be movable between an initial position and a forward position, for moving the holder from the first position to the second position upon movement of the loading/ejecting member from the initial position to the forward position, and for moving the holder from the second position to the first position upon movement of the loading/ejecting member from the forward position to the initial position; biasing means for biasing the loading/ejecting member toward the forward position; latching means, engaged with the loading/ejecting member, for latching the loading/ejecting member in the initial position; an urging member supported by the holder to be movable between a first position and a second position such that the urging member is moved from the first position to the second position upon insertion of the magnetic disk into the holder, thereby urging the latching means to disengage the latching means from the loading/ejecting member; urging member biasing means for biasing the urging member toward the first position thereof; locking means, disposed in the holder, for locking the magnetic disk in a predetermined position in the holder when the magnetic disk is inserted in the predetermined position in the holder; and releasing means for releasing a locked state of the locking means when the loading/ejecting member is moved from the forward position to the initial position and is latched at the initial position.

According to the loading/ejecting device of the present invention, the holder for holding the magnetic disk can be linearly moved by the loading/ejecting member. The loading/ejecting device of the present invention requires smaller space for movement of the holder than that in the conventional loading/ejecting device. As a result, a magnetic disk drive apparatus can be made more compact. In addition, the magnetic disk can be linearly moved to the second position (loading position) together with the holder. For this reason, the magnetic disk can be precisely moved to predetermined positions corresponding to a driving means, a magnetic reproducing means and so on of the magnetic disk drive apparatus.

Furthermore, the magnetic disk inserted in the holder is locked by the locking means at the predetermined position. When the magnetic disk is to be ejected, the locking means locks the magnetic disk until the loading/ejecting member is moved from the forward position to the initial position and is latched in the initial position (i.e., until the holder is completely moved to the first position thereof). Therefore, even if the loading/ejecting member is stopped at a halfway position, and the holder is moved again to the second position, the magnetic disk will not be clamped by the holder. As a result, according to the present invention, the magnetic disk can be properly ejected, and the magnetic disk, the drive apparatus and the like will not be damaged.

BRIEF DESCRIPTION OF THE DRAWINGS

FIGS. 1 to 15 shows a loading/ejecting device according to an embodiment of the present invention, in which:

DESCRIPTION OF THE PREFERRED EMBODIMENT

A loading/ejecting device according to an embodiment of the present invention will be described with reference to the accompanying drawings.

As shown in FIGS. 1 to 4, a loading/ejecting device 10 has a pair of guide plates 14 mounted on a base 12 of a magnetic disk drive apparatus such as a word processor. The base 12 has a base plate 16 and a front plate 18 extending upright at one end thereof. The guide plates 14 are fixed on the base plate 16 and are spaced by a predetermined distance to oppose each other. Each guide plate 14 has a pair of first guide holes 20 and a pair of second guide holes 22. The first guide holes 20 are formed at portions at the two ends of each guide plate 14 and extend to be parallel to each other and perpendicular to the surface of the base plate 16. The second guide holes 22 are spaced apart from each other between the first guide holes 20 and extend parallel to the base plate 16. In other words, the second guide holes 22 extend along a direction perpendicular to the extending direction of the first guide holes 20. A spindle 24 for driving the magnetic disk is rotatably mounted on the base plate 16. The spindle 24 extends upright from and through the base plate 16 and is located between the guide plates 14. The spindle 24 is driven by a driving source (not shown). Three positioning projections 25 extend upward from the surface of the base plate 16 so as to position the magnetic disk in the predetermined position. Positioning pins 27 extend upward from the upper end faces of two of the three positioning projections 25, respectively.

Figure 1:
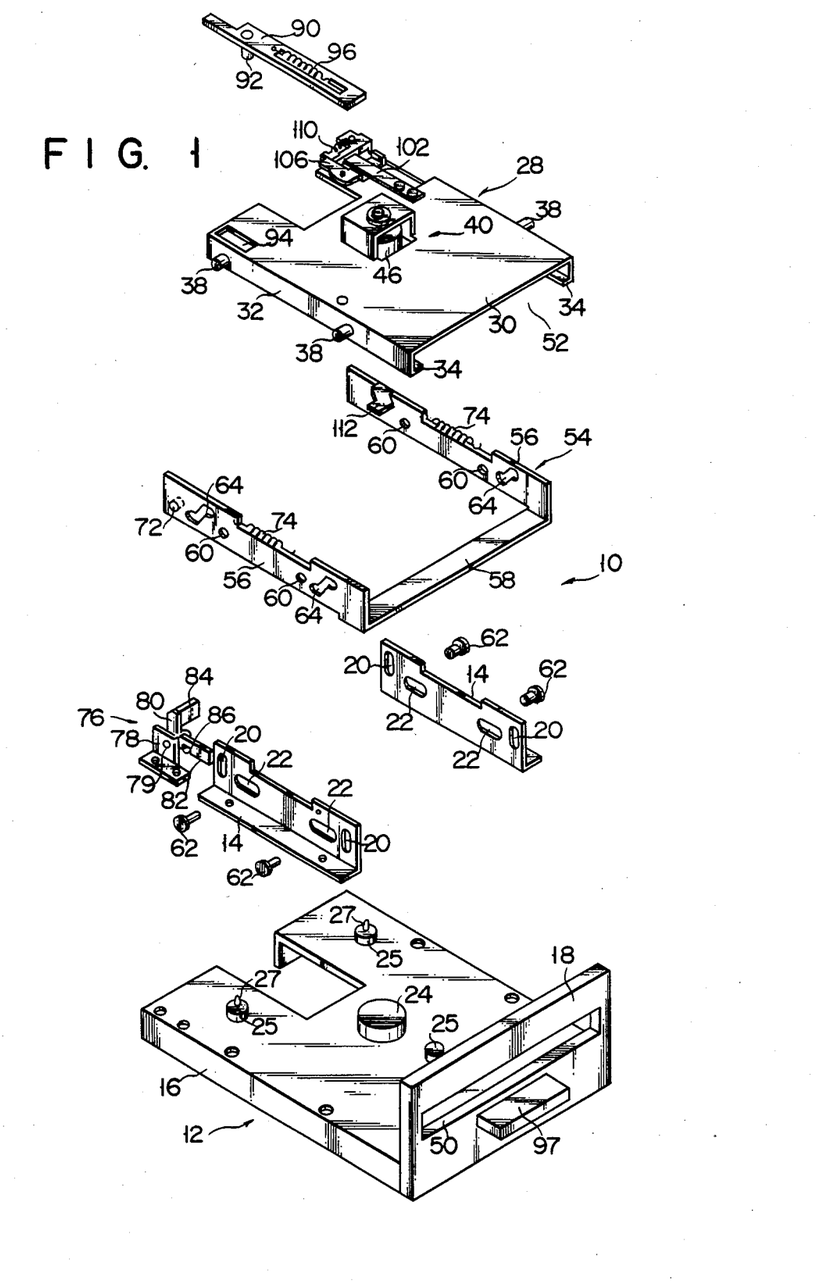
FIG. 1 is an exploded perspective view thereof.
Figure 2:
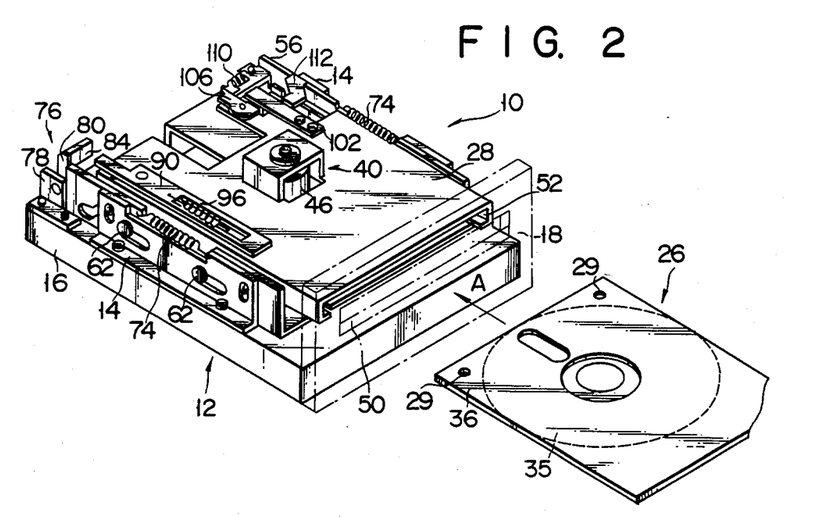
FIG. 2 is a perspective view thereof.

The loading/ejecting device 10 has a holder 28 which is movably disposed between the guide plates 14 and which can hold a floppy disk 26 therein. The holder 28 is constituted by bending a substantially rectangular plate and includes an upper wall 30, a pair of opposing side walls 32, and flanges 34 formed by bending the lower end portions of the side walls 32 inward. Referring to FIG. 2, the floppy disk 26 has a box-like case 36 made of a material such as a plastic material and a flexible magnetic disk 35 held in the case 36. A pair of positioning holes 29 are formed in the case 36 so as to correspond to the positioning pins 27, respectively. The distance between the side walls 32 is substantially the same as the width of the case 36. The holder 28 has four guide pins 38. Referring back to FIG. 1, two of the guide pins 38 extend outward from one side wall 32, and the remaining two thereof extend outward from the other side wall 32. The guide pins 38 are inserted in the first guide holes 20, respectively. The holder 28 is thus supported by the guide plates 14 to be movable from the first position where the guide pins 38 are respectively located at the upper ends of the guide holes 20 to the second position where the guide pins 38 are respectively located at the lower ends of the guide holes 20. In other words, the holder 28 is supported by the guide plates 14 to be linearly movable along the vertical direction. The holder 28 has clamping means 40. The clamping means 40 cooperates with the spindle 24 to clamp the magnetic disk 35 when the holder 28 is moved to the second position together with the floppy disk 26. As is apparent from FIG. 5, the clamping means 40 has a support shaft 44 which is supported by a support portion 42 formed on the upper wall 30 of the holder 28. The support shaft 44 is rotatably supported to be movable along the vertical direction. A clamper 46 is mounted at the lower end of the support shaft 44 and is located in the holder 28 so as to oppose the spindle 24. A compression spring 48 is hooked between the support portion 42 and the clamper 46 to bias the clamper 46 toward the spindle 24.

The front plate 18 of the base 12 has an insertion port 50 for receiving the floppy disk 26 therethrough. One end (i.e., the right end in FIG. 4) of the holder 28 opposes the insertion port 50 and defines an insertion/ejection port 52 for inserting the floppy disk 26 into the holder or ejecting it from the holder. The floppy disk 26 can be inserted in the holder 28 through the insertion port 50, and through the insertion/ejection port 52 along the direction indicated by arrow A.

Figure 4:
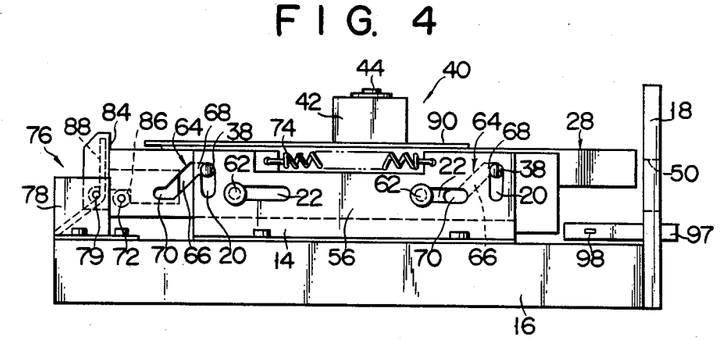
FIGS. 4 and 5 are respectively a side view and a schematic front view of the device when a holder is located in a first position thereof.

The loading/ejecting device 10 has a loading/ejecting member 54 movably supported by the guide plates 14. The member 54 has a pair of substantially rectangular loading/ejecting plates 56 separated by a predetermined distance to be opposite to each other, and a connecting plate 58 connecting the loading/ejecting plates 56. Each plate 56 is positioned between the corresponding guide plate 14 and the holder 28 and has a pair of support holes 60. One end of a support pin 62 inserted from the outside of each guide plate 14 in the corresponding guide hole 22 is tightly inserted in the corresponding support hole 60. The loading/ejecting member 54 is supported by the guide plates 14 to be movable between the initial position where each support pin 62 is located at the left end of the corresponding second guide hole 22 and the forward position where this support pin is located at the right end of the corresponding second guide hole 22. In other words, the loading/ejecting member 54 is supported to be movable along the direction parallel to the base plate 16. Each loading/ejecting plate 56 has a pair of holding holes 64. As shown in FIG. 4, each hole 64 has an inclined portion 66 inclined at about 45 degrees with respect to the first guide holes 20, a first holding portion 68 horizontally extending from the upper end of the inclined portion 66 to the right, and a second holding portion 70 horizontally extending from the lower end of the inclined portion 66 to the left. The guide pins 38 of the holder 28 are inserted in the first guide holes 20 of the guide plates 14 through the holding holes 64, respectively. The loading/ejecting member 54 has an engaging pin 72 extending inward from one (frontmost plate in FIG. 1) of the loading/ejecting plates 56. The loading/ejecting member 54 is biased toward the forward position by tension springs 74 which are respectively hooked between the member 54 and the corresponding guide plates 14.

Figure 3:
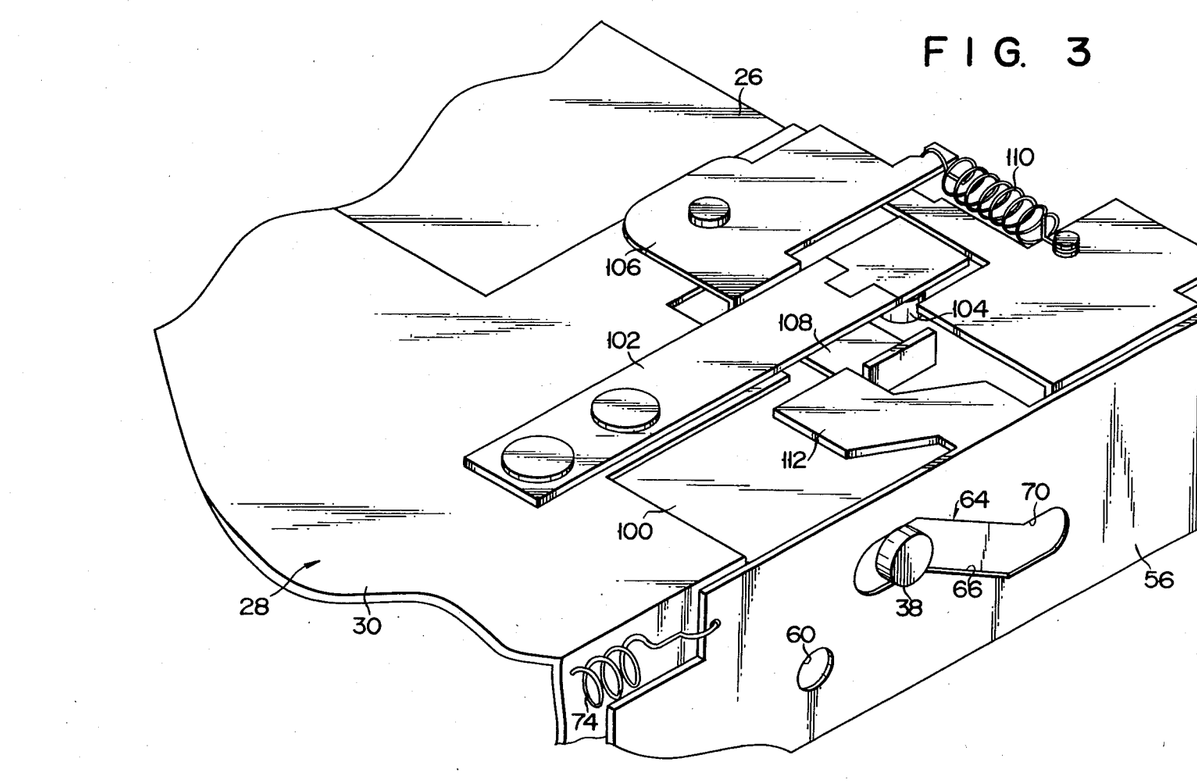
FIG. 3 is an enlarged perspective view of locking means and releasing means.

As shown in FIG. 3, an opening 100 is formed at the rear portion of the upper wall 30 of the holder 28. A hold plate 102 serving as the locking means is mounted on the upper wall 30 of the holder 28. The hold plate 102 comprises, for example, a leaf spring, one end portion of which is fixed at the upper wall 30 and the other end portion of which is located above the opening 100. A lock pin 104 is fixed at the other end of the plate 102. The lock pin 104 extends into the holder 28 through the opening 100. When the floppy disk 26 is inserted to a predetermined position in the holder 28, the lock pin 104 is fitted in one positioning hole 29 formed in the case 36 to lock the floppy disk at the predetermined position (see FIG. 13). The proximal end portion of the lock pin 104 is tapered. An L-shaped release lever 106 is pivotally mounted on the upper wall 30 of the holder 28. One end portion of the lever 106 is bent to constitute an urging portion 108. The urging portion 108 is positioned in the opening 100 and below the hold plate 102. A tension spring 110 is hooked between the other end of the lever 106 and the holder 28 to bias the lever 106 clockwise. An urging arm 112 extends horizontally inward from the upper edge of one loading/ejecting plate 56. The arm 112 is positioned above the opening 100 of the holder 28. The arm 112 abuts against the urging portion 108 of the release lever 106 to pivot the release lever 106 counterclockwise when the loading-/ejecting member 54 is moved from the forward position to the initial position, thereby causing the urging portion 108 to urge the lock pin 104 and lift the other end portion of the hold plate 102 together with the lock pin 104. As a result, the lock pin 104 is disengaged from the corresponding positioning hole 29 of the floppy disk 26, so that the floppy disk is released.

The loading/ejecting device 10 has latching means 76 for holding the loading/ejecting member 54 in the initial position. The latching means 76 has a support plate 78 which is fixed on the base plate 16 and which is aligned with the guide plate 14 (frontmost guide plate in FIG. 1), and a latch member 80 pivotally supported by a support shaft 79 on the support plate 78. The latch member 80 has an engaging portion 82 extending toward the corresponding guide plate 14 and an urging portion 84 extending horizontally inward. A latch groove 86 which can engage with the engaging pin 72 of the corresponding loading/ejecting plate 56 is formed in the engaging portion 82. The latch member 80 is biased clockwise by a torsion spring 88 wound around the support shaft 79. When the groove 86 is engaged with the engaging pin 72, the latching means 76 locks the loading/ejecting member 54 in the initial position against the biasing force of the tension springs 74.

The loading/ejecting device 10 also has an urging member 90 for releasing the loading/ejecting member 54 which is locked by the latching means 76, when the floppy disk 26 is loaded. The urging member 90 has a substantially elongated rectangular plate shape and is movably mounted on the holder 28. The urging member 90 has an urging pin 92 extending downward. The urging pin 92 is inserted in an elongate hole 94 which is formed at the left end portion of the upper wall 30 of the holder 28 and which extends along the insertion direction (longitudinal direction of the side wall 32) of the floppy disk 26. Hence, the urging pin 92 extends in the holder 28. The urging pin 92 is movable along the insertion direction of the floppy disk 26 between one end (i.e., a first position corresponding to the end of the holder 28 which faces the insertion/ejection port 52) of the elongate hole 94 and the other end (i.e., second position) of the hole 94. The urging member 90 is biased to the first position by a tension spring 96 which is hooked between the urging member 90 and the holder 28. When the floppy disk 26 is inserted in the holder 28, the urging pin 92 is urged by the floppy disk 26, so that the urging member 90 is moved from the first position to the second position. The left end of the urging member 90 urges the urging portion 84 of the latch member 80 to pivot the latch member 80 counterclockwise about the support shaft 79. As a result, the latch groove 86 is disengaged from the engaging pin 72. It should be noted that reference numeral 97 in FIGS. 1 and 4 denotes an eject button for moving the loading/ejecting member 54 from the forward position to the initial position. The eject button 97 is slidably supported by the front plate 18. The left end of the eject button 97 can urge the connecting plate 58 of the loading/ejecting member 54. The eject button 97 also has a stopper 98 for preventing the button 97 from being removed from the front plate 18.

The operation of the loading/ejecting device 10 having the construction described above will be described hereinafter.

Figure 5:
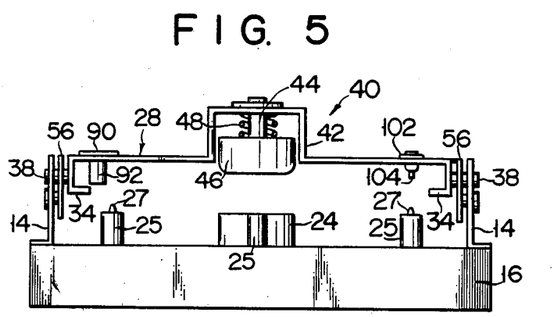

The holder 28 is normally located at the first position, as shown in FIGS. 4 and 5. The loading/ejecting member 54 is locked by the latching means 76 in the initial position as illustrated. In this state, the guide pins 38 of the holder 28 are located at the upper ends of the first guide holes 20, respectively, and are positioned in the first holding portions 68 of the holding holes 64. For these reasons, each guide pin 38 will not be moved downward, and the holder 28 is held in the illustrated first position. In this first position, the insertion/ejection port 52 of the holder 28 opposes the insertion port 50 of the front plate 18. Therefore, the operator can insert the floppy disk 26 in the holder 28 through the ports 50 and 52. The urging member 90 is urged by the tension spring 96 to be located in the first position.

When the floppy disk 26 is inserted in the holder 28 through the insertion port 50 and the insertion/ejection port 52 along the direction indicated by arrow A (FIG. 2), the urging pin 92 of the urging member 90 is urged by the floppy disk, and the urging member 90 is shifted from the first position to the second position. Slightly before the floppy disk 26 is completely inserted (i.e., slightly before the urging member 90 reaches the second position), the left end of the urging member 90 abuts against the urging portion 84 of the latch member 80. The latch member 80 is thus pivoted counterclockwise about the support shaft 79 against the biasing force of the torsion spring 88 until the urging member 90 reaches the second position. The latch groove 86 is then disengaged from the engaging pin 72, and the loading-/ejecting member 54 is biased by the torsion spring 74 and is moved toward the forward position (i.e., to the right in FIG. 4). When the floppy disk 26 is completely inserted in the holder 28, the lock pin 104 of the hold plate 102 is inserted in the corresponding positioning hole 29 of the floppy disk 26, thereby locking the floppy disk at the predetermined position in the holder 28.

Figure 6:
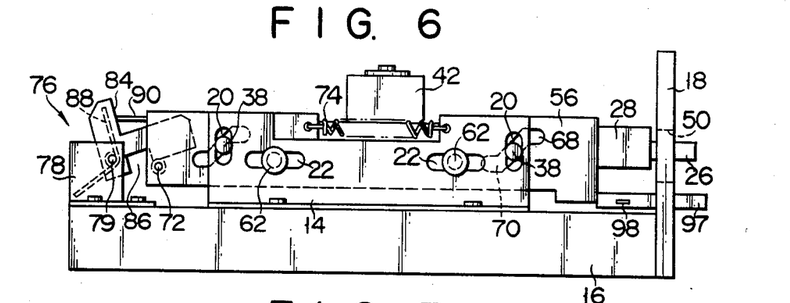
FIGS. 6 and 7 are respectively a side view and a schematic front view of the device when the holder is being moved from the first position to the second position.
Figure 7:
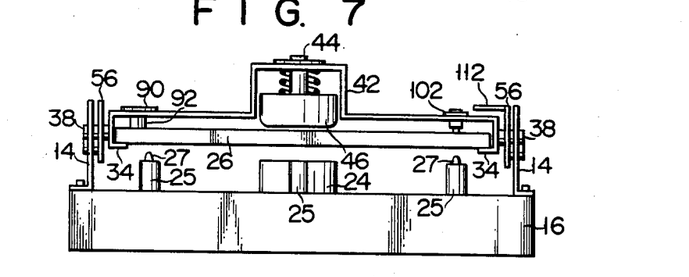
Figure 8:
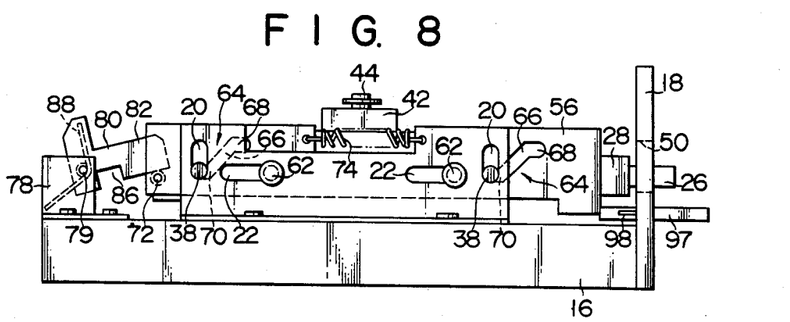
FIGS. 8 and 9 are respectively a side view and a schematic front view of the device when the holder is located in a second position thereof.
Figure 9:
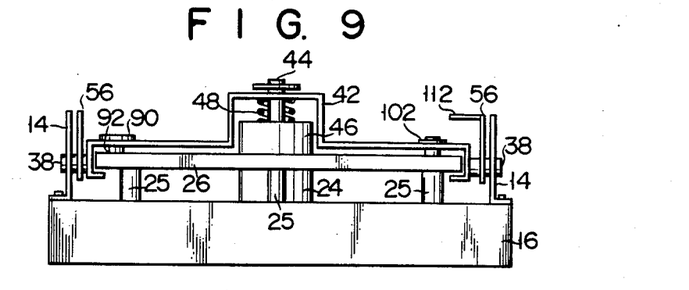
Figure 10:
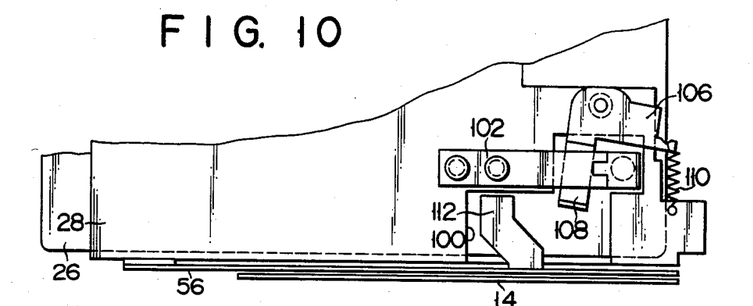
FIGS. 10 and 11 are respectively a plan view and a partially cutaway schematic side view of the device when the holder is located in the second position.
Figure 11:
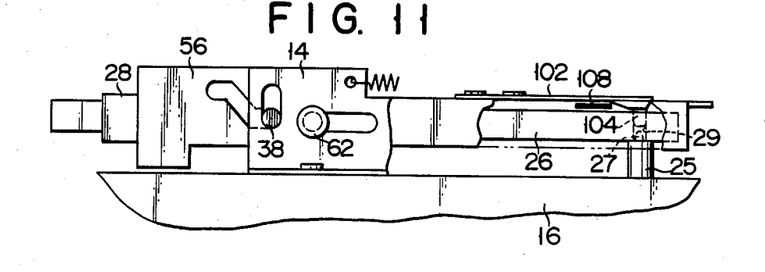

When the loading/ejecting member 54 is moved to the right, as shown in FIGS. 6 and 7, the guide pins 38 of the holder 28 are guided downward by the corresponding inclined portions 66 of the holding holes 64 and the corresponding first guide holes 20. The holder 28 is thus moved downward together with the floppy disk 26. During the movement, the floppy disk 26 is placed on the flanges 34 of the holder 28. The eject button 97 is urged by the connecting plate 58 and is moved to the right.

When the loading/ejecting member 54 reaches the forward position, as shown in FIGS. 8 to 11, the guide pins 38 of the holder 28 are moved to the lower ends of the first guide holes 20, respectively. The guide pins 38 are also positioned in the second holding portions 70 of the holding holes 64, so that the holder 28 reaches the illustrated second position and is held there. The lower edge of the engaging portion 82 of the latch member 80 abuts against the engaging pin 72, and the latch member 80 is held at the illustrated position. The urging arm 112 is separated from the urging portion 108 of the release lever 106, and the lever 106 is biased by the tension spring 110 to separate from the lock pin 104. In this state, the floppy disk 26 is placed on the positioning projections 25 such that the positioning pins 27 are respectively inserted in the positioning holes 29 of the case 36. The magnetic disk 35 in the case 36 is clamped between the spindle 24 and the clamper 46 biased by the compression spring 48. The magnetic disk 35 can be driven by the spindle 24. When the spindle 24 is rotated by a driving source (not shown), the magnetic disk 35 is rotated to perform the desired leading/writing.

Figure 12:
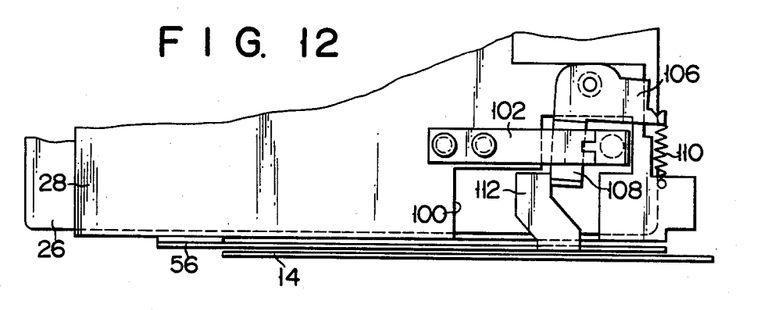
FIGS. 12 and 13 are respectively a plan view and a partially cutaway schematic side view of the device when ejection is being performed.
Figure 13:
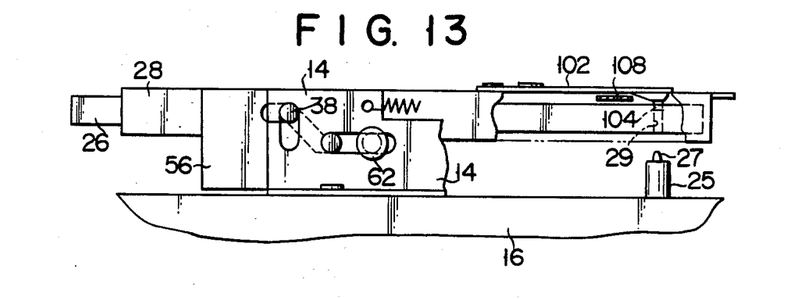
Figure 14:
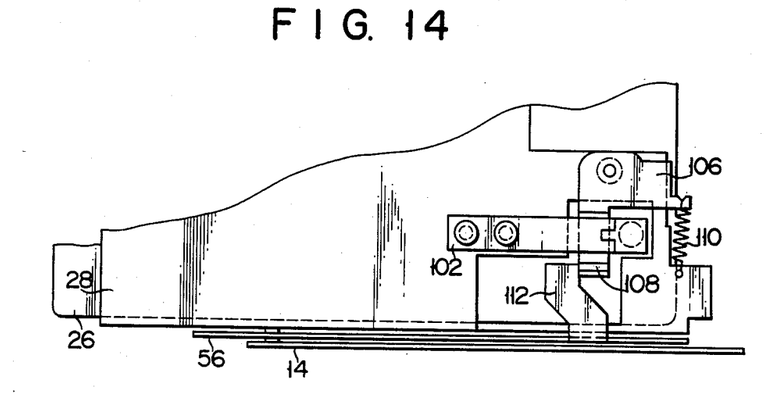
FIGS. 14 and 15 are respectively a plan view and a partially cutaway schematic side view of the device when the locking means is released.
Figure 15:
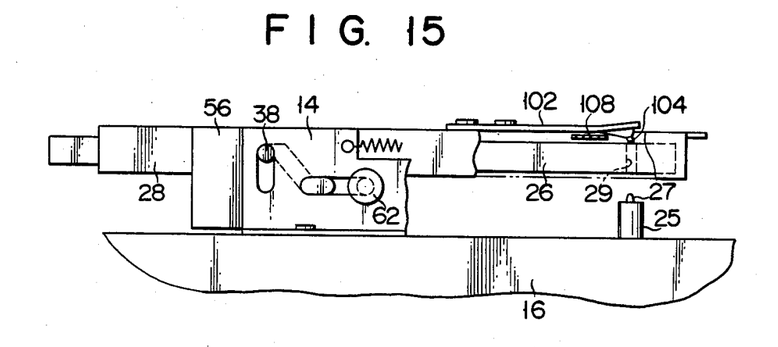

When the operator depresses the eject button 97, the floppy disk 26 is ejected from the holder 28. More particularly, when the eject button 97 is depressed, the loading/ejecting member 54 is urged to the left (i.e., toward the initial position) through the connecting plate 58. When the member 54 reaches the initial position, the engaging pin 72 engages with the latch groove 86 of the latch member 80, thereby locking the member 54 in the initial position. At the same time, while the loading-/ejecting member 54 is moved from the forward position to the initial position, the guide pins 38 of the holder 28 are guided by the inclined portions 66 of the holding holes 64 and the first guide holes 20 and respectively reach the upper ends of the first guide holes 20. The holder 28 is thus moved upward together with the floppy disk 26 to the first position shown in FIG. 4. At the same time, as shown in FIGS. 12 and 13, the positioning pins 27 are disengaged from the positioning holes 29 of the floppy disk 26, and the urging arm 112 abuts against the urging portion 108 of the release lever 106 upon movement of the loading/ejecting member 54. In this state, the floppy disk 26 is still locked by the lock pin 104. The length of the latch groove 86 of the latch member 80 is longer than the diameter of the engaging pin 72. For this reason, after the engaging pin 72 is engaged with the groove 86, the loading/ejecting member 54 can be further inserted. When the member 54 is further inserted, the urging arm 112 urges the urging portion 108 of the release lever 106 to pivot the release lever 106 counterclockwise, as shown in FIGS. 14 and 15. The urging portion 108 urges the tapered portion (i.e., proximal end portion) of the lock pin 104 upward, so that the other end of the hold plate 102 is moved upward together with the lock pin. As a result, the lock pin 104 is removed from the corresponding positioning hole 29 of the floppy disk 26, thereby releasing the floppy disk. The urging member 90 is moved by the biasing force of the tension spring 96 from the second position to the first position. The floppy disk 26 in the holder 28 is urged by the urging pin 92 of the urging member 90 to the right. The floppy disk 26 is thus ejected from the holder 28 through the insertion/ejection port 52 and the insertion port 50.

According to the loading/ejecting device 10 having the construction described above, the holder 28 is linearly moved along the vertical direction when the floppy disk 26 is subjected to loading/ejecting. For this reason, the distance of displacement of the holder of the device of the present invention becomes shorter than that of the conventional device. In addition, the space for allowing movement of the holder is smaller than that in the conventional device. As a result, a compact magnetic disk drive apparatus can be provided. Furthermore, according to the loading/ejecting device 10, the floppy disk 26 can be precisely moved to the predetermined positions corresponding to the driving means, the magnetic leading/writing means and so on of the magnetic disk drive apparatus.

Furthermore, the device 10 has locking means for locking the floppy disk 26. During ejecting, when the operator stops the insertion of the loading/ejecting member 54 before the member 54 is locked at the initial position, the member is returned by the tension springs 74 to the forward position. The holder 28 is temporarily moved upward and then downward. For this reason, when this locking means is not arranged, the floppy disk 26 is moved together with the holder 28 halfway down and is clamped by the holder. However, according to the loading/ejecting device 10, the floppy disk 26 is locked by the locking means in the holder 28 until the loading/ejecting member 54 is locked in the initial position. Therefore, even if the insertion of the loading-/ejecting member during ejection is interrupted, the floppy disk 26 will not be clamped by the holder 28, thereby preventing damage to the floppy disk, driving mechanism and so on, and properly ejecting the floppy disk.

The present invention is not limited to the particular embodiment described above. Various changes and modifications may be made within the spirit and scope of the invention. For example, the hold plate is not limited to the leaf spring but can be extended to any elastic plate. In addition, the number of positioning projections may be increased as needed.

What is claimed is:

1. A device for loading and ejecting a magnetic disk assembly including a disk element and a casing containing said disk element for movement into and from a magnetic disk drive apparatus having a base and means. mounted on the base, for driving the magnetic disk assembly, comprising:

means, including a pair of guide plates mounted on the base so as to oppose each other at a peredetermined distance, for guiding the magnetic disk assembly into and from the magnetic disk drive apparatus;

a holder located above the driving means and holding the magnetic disk assembly therein, the holder being supported by the guiding means so as to be linearly movable between a first position where the magnetic disk assembly can be inserted or ejected from the holder and a second position where the magnetic disk assembly can be driven by the driving means, said holder having an upper wall of a substantially rectangular shape, with an opening therein, a first pair of opposing side walls, and a second pair of opposing side walls, one of the second pair of side walls defining a port means for inserting and ejecting the magnetic disk assembly therethrough, said holder being disposed between the guide plates, so that the first pair of side walls face the guide plates, respectively;

a loading/ejecting member, supported by the guiding means, so as to be movable between an initial position and a forward position, for moving the holder from the first position to the second position upon movement of the member from the initial postion to the forward position and for moving the holder from the second position to the first position upon movement of the member from the forward position to the initial position;

means for biasing the loading/ejecting member toward the forward position;

means, engaged with the loading/ejecting member, for latching the loading/ejecting member in the initial position;

an urging member mounted on the holder, to be movable between a first position and a second position, such that the urging member is moved from the first position to the second position upon insertion of the magnetic disk assembly into the holder, and, such that the urging member at its second position, urges the latching means to disengage from the loading/ejecting member, so that the urging member ejects the disk element from the holder upon movement of the urging member from the second position to the first position;

means for biasing the urging member toward the first position;

operating means for pushing the loading/ejecting member toward the initial position;

means, disposed in the holder, for locking the magnetic disk assembly in a predetermined position in the holder when the magnetic disk assembly is inserted at the predetermined position in the holder, said locking means including an elastically deformable hold plated mounted on the holder and having one end portion extending into the opening, and a lock pin which extends into the holder from the one end portion of the hold plate and which engages with a corresponding positioning hole of the casing, to lock the magnetic disk when the magnetic disk is inserted in the predetermined position in the holder; and means for releasing the locking means from a locked state when the loading/ejecting member is moved from the forward position to the initial position and is latched at the initial position.

2. A device according to claim 1 wherein each of said guide plates has a pair of elongate first guide holes which oppose each other at a predetermined distance and which are parallel to each other, and the holder has a plurality of guide pins which project in pair from each side wall toward the corresponding guide plate and each of which is slidably inserted in its corresponding first guide hole.

3. A device according to claim 2, wherein each of said guide plates has a plurality of elongate second guide holes which extend perpendicularly to the first guide holes; and the loading/ejecting member includes a pair of loading/ejecting plates which oppose each other and are respectively located between their corresponding guide plates and the holder, a connecting plate connecting the loading/ejecting plates, and support pins respectively slidably inserted in the second guide holes and fixed at one end to the loading/ejecting plates.

4. A device according to claim 3, wherein each of said loading/ejecting plate has a pair of holding holes each of which has an elongate inclined portion inclined at a predetermined angle with respect to the second guide holes, and each of the guide pins being inserted in a corresponding one of the first guide holes through a corresponding one of the holding holes.

5. A device according to claim 4, wherein each of said holding holes has first and second holding portions which extend in opposite directions from two ends of the inclined portion along a direction perpendicular to the first guide holes, and each of the guide pins being positioned in the first holding portion of its corresponding holding hole when the holder is in the first position thereof and in the second holding portion of the corresponding holding hole when the holder is in the second position thereof.

6. A device according to claim 3, wherein one of said loading/ejecting plates has an engaging pin; and the latching means includes a support plate erected on the base to be adjacent and parallel to the one loading/ejecting plate, pivoting means provided on the support plate, a latch member pivotally mounted on the pivoting means, the latch member having an engaging portion to be engaged with the engaging pin and an urging portion, and a biasing member for biasing the latch member in such a direction that the engaging portion engages with the engaging pin, and the engaging pin being engaged with the engaging portion when the loading/ejecting member is located in the initial position.

7. A device according to claim 6, wherein said urging member is disposed on the upper wall of the holder to be movable along an insertion direction of the magnetic disk and has an urging pin which extends into the holder and which can abut against the magnetic disk inserted in the holder, the urging pin being pushed by the magnetic disk inserted in the holder to move the urging member from the first position to the second position, the urging member being operated to push the urging portion of the latch member and pivot the same, thereby disengaging the engaging portion from the engaging pin as the urging member is being moved from the first position to the second position thereof.

8. A device according to claim 2, wherein said first guide holes extend perpendicularly to the base, and the holder is moved perpendicular to the base between the first and second positions thereof.

9. A device according to claim 1, wherein said holder has clamping means for clamping the magnetic disk held in the holder, in conjunction with the driving means, when the holder is in the second position thereof.

10. A device according to claim 9, wherein said clamping means includes means for providing sliding movement, a support shaft which is slidably supported on the sliding means by the upper wall of the holder and which extends into the holder, a clamper fixed at an extended end of the support shaft and positioned to oppose the driving means, and a biasing member hooked between the upper wall and clamper and biasing the clamper toward the driving means.

11. A device according to claim 1, wherein said hold plate has a leaf spring.

12. A device according to claim 1, wherein said relasing means includes a release lever movably mounted on the holder and having an urging portion being capable of urging the lock pin, and an urging arm, fixed on the loading/ejecting member, for urging the urging portion of the release lever to urge the lock pin, wherein said relasing means has a biasing member for biasing the releasing lever in such a direction that the urging portion of the releasing lever is separated from the lock pin, thereby removing the lock pin when the loading/ejecting member is moved from the forward position to the initial position.

13. A device according to claim 1, which further comprises positioning means, mounted on the base, for positioning the magnetic disk in the holder when the holder is located in the second position thereof.

14. A device according to claim 13, wherein said positioning means includes a plurality of projections erected on the base and having the same level to support the casing of the magnetic disk, and positioning pins formed on the end faces of at least two of the projections and fitted in the positioning holes of the casing when the holder is moved in the second position thereof.

15. A device for loading and ejecting a magnetic disk assembly into and from a magnetic disk drive apparatus having a base and a means, mounted on the base, for driving the magnetic disk assembly, said magnetic disk assembly having a disk element and a casing which covers the disk element, comprising:

means, mounted on the base, for guiding the magnetic disk assembly into and from the magnetic disk drive apparatus;

a holder located above the driving means and holding the magnetic disk assembly therein, the holder being supported by the guiding means so as to be linearly movable between a first position where the magnetic disk assembly can be inserted or ejected from the holder and a second position where the magnetic disk assembly can be driven by the driving means;

a loading/ejecting member supported by the guiding means so as to be movable between an initial position and a forward position, for moving the holder from the first position to the second position upon movement of the member from the initial position to the forward position and for moving the holder from the second position to the first position upon movement of the member from the forward position to the initial position;

means for biasing the loading/ejecting member toward the forward position;

means, engaged with the loading/ejecting member, for latching the loading/ejecting member in the initial position;

an urging member mounted on the holder, to be movable between a first position and a second position, such that the urging member is moved from the first position to the second position upon insertion of the magnetic disk assembly into the holder, and, such that the urging member at its second position, urges the latching means to disengage from the loading/ejecting member so that the urging member ejects the disk element from the holder upon movement of the urging member from the second position to the first position;

means for biasing the urging member toward the first position;

operating means for pushing the loading/ejecting member toward the initial position;

means, disposed in the holder, for locking the magnetic disk assembly in a predetermined position in the holder when the magnetic disk assembly is inserted at the predetermined position in the holder; and means for releasing the locking means from a locked state when the loading/ejecting member is moved from the forward position to the inital position and is latched at the initial position, said releasing means having a releasing member fixed to the loading/ejecting member.

* * * * *